No. 767,562.

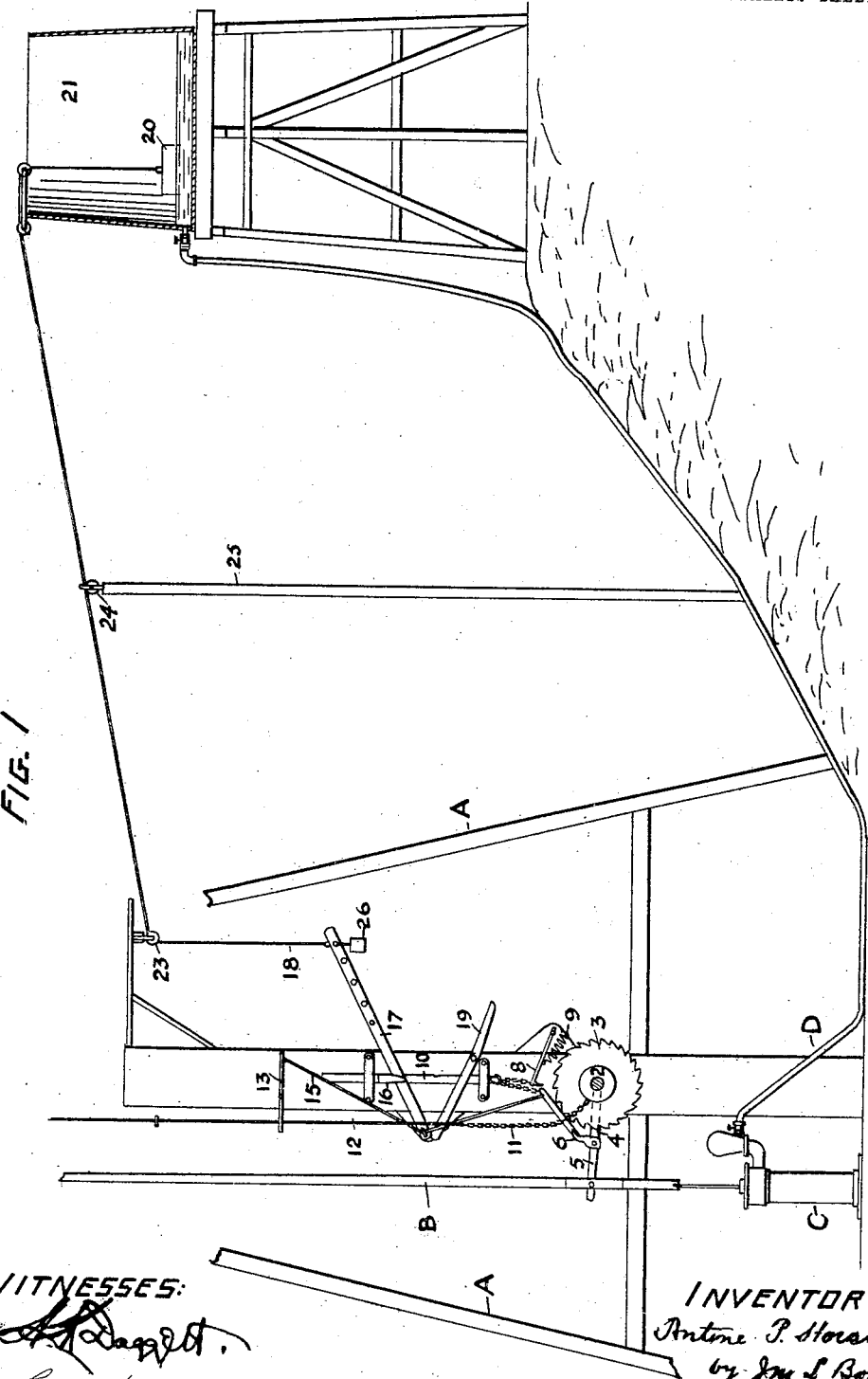

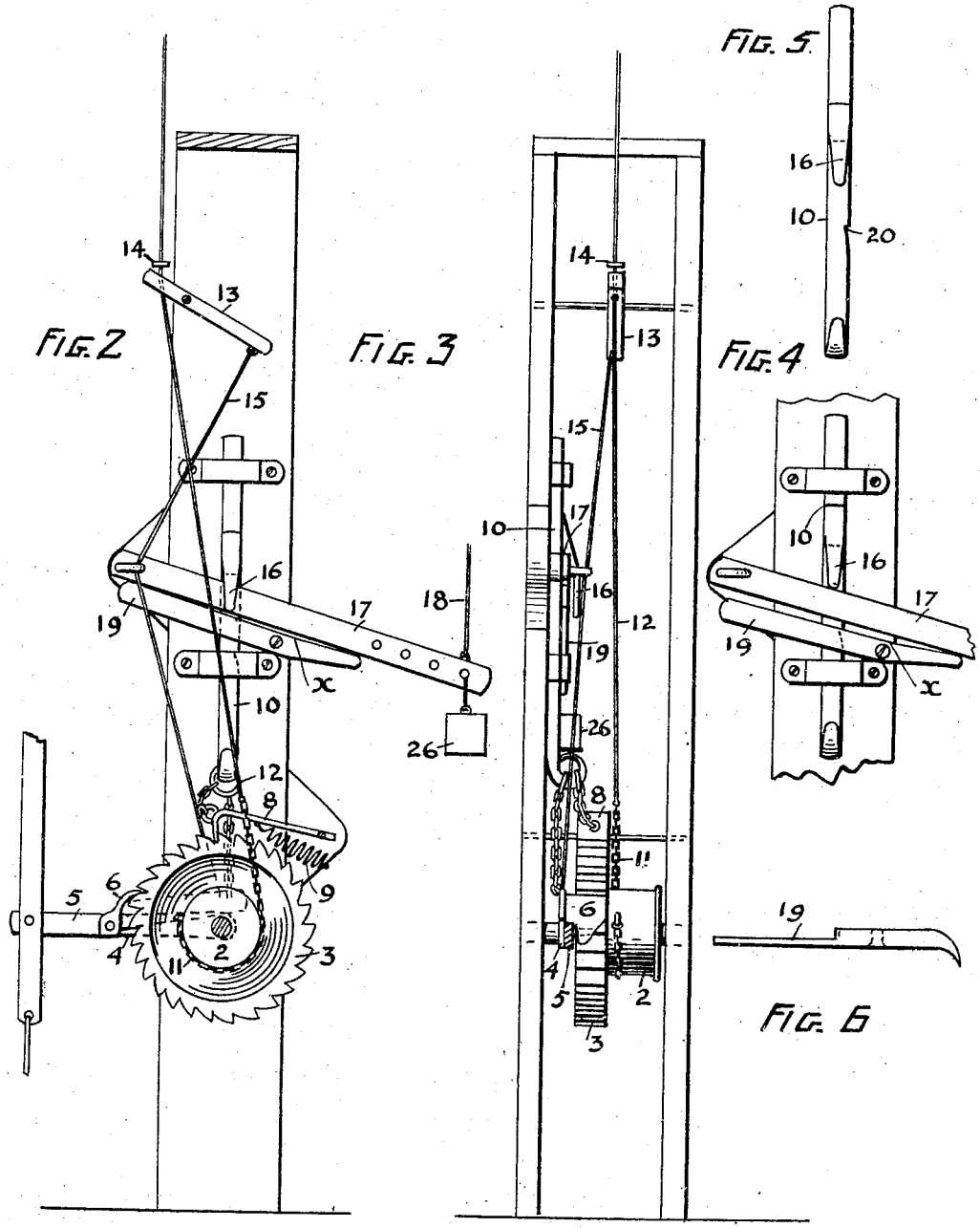

Patented August 16, 1904.

UNITED STATES PATENT OFFICE.

ANTONE P. HOESLY, OF MARTINEZ, CALIFORNIA.

AUTOMATIC WINDMILL-REGULATOR.

SPECIFICATION forming part of Letters Patent No. 767,562, dated August 16, 1904.

Application filed January 2, 1904. Serial No. 187,579. (No model.)

*To all whom it may concern:*

Be it known that I, ANTONE P. HOESLY, a citizen of the United States, residing at Martinez, Contra Costa county, State of California, have invented certain new and useful Improvements in Automatic Windmill-Regulators; and I do hereby declare the following to be a full, clear, and exact description of said invention, such as will enable others skilled in the art to which it most nearly appertains to make, use, and practice the same.

My invention relates to an improved mechanism for automatically regulating the pumping action of a windmill by the rise and fall of a float in the tank into which the water is pumped.

I call the device a "long-distance" regulator, because it is adapted for regulating the windmill, no difference what the distance may be from the pumping-point to the tank; and it consists of the mechanism and devices hereinafter fully indicated and explained.

Referring to the drawings, Figure 1 is a side elevation showing the regulating mechanism and its connections with the float in the tank. Fig. 2 is a side elevation (enlarged) of the regulating mechanism commencing to wind. Fig. 3 is an edge view in elevation of the regulating mechanism. Fig. 4 is a side elevation of the operating-lever and tripping-lever. Fig. 5 is a detached view of the sliding lever, and Fig. 6 is an edge view of the tripping-lever.

A represents the posts of a windmill-frame.

C represents the pump, and D the pipe which connects with the spout of the pump and leads to the tank 21.

Inside of the windmill-frame and alongside of the pump-rod B, I mount a frame or casing in which the regulating mechanism is mounted. This frame or casing will usually consist of two upright boards spaced at a short distance apart and properly connected together, so as to support the mechanism between them. Supported between these uprights by gudgeons or journals and at the proper height from the ground I mount a shaft or windlass 2, upon which is a ratchet-wheel 3. On one side of this ratchet-wheel the size of the shaft is reduced and a lever 4 has one end secured loosely around this reduced portion, and the lever extends beyond the rim of the ratchet-wheel 3, and its opposite end is connected with the pump-rod by a link 5. To this lever is connected a pawl 6 in such position that when the outer or free end of the lever is dropped down the pawl 6 will engage with the teeth of the ratchet-wheel; but when the free end of the lever is elevated the pawl is raised out of the ratchet-teeth and held suspended. The lever and pawl are made in a single piece by forming the pawl so as to project out on one side of the lever and engage with the ratchet-teeth, while the lever extends to one side and lies next to the face of the wheel. A reverse hook-shaped pawl 8 is mounted on the opposite side of the ratchet-wheel 3, and a slight spring 9 causes it to drop down into engagement with the teeth of the ratchet-wheel and hold the wheel during the downward movement of the pawl 6. The free end of the pawl-lever 4 and the reverse holding-pawl 8 are both connected by a chain or other flexible connection with the lower end of a vertically-sliding bar 10, so that when the bar is raised, as hereinafter described, both these pawls 4 and 8 are elevated and suspended free from the ratchet. The shaft on the opposite side of the ratchet is enlarged, so as to form a winding-drum or windlass, and a short chain 11 is attached to it so as to be wound upon the drum or windlass by the rotation of the shaft. The opposite end of this chain is connected by a wire 12 with the windmill or its vanes, so that the winding up of the chain draws upon the wire 12 and throws the windmill out of action. This wire 12 passes freely through a hole in one arm of a two-armed lever 13, which is pivoted between the uprights above the windlass, and a knot or enlargement 14 serves as a stop by being too large to pass through the hole and prevents too great tension from coming upon the wire, and it also serves to operate the two-armed lever so as to draw down one end of the lever and throw the opposite end upward. To this opposite end of the lever is attached a wire 15, which passes down and is connected to the pawl-lever 4 and lifts it so as to disengage its pawl from the teeth of the ratchet-wheel 3.

A vertically-sliding bar 10, to the lower end of which the pawl-lever 4 and reverse-pawl 8 are connected by flexible connections, moves freely up and down in guides on the upright of the frame, and it has a projection or shoulder in the form of a hook on its front. A lever 17 is pivoted at one end to the upright and extends horizontally across below the projection 16, and its outer or free end is connected with the float in the tank by a wire 18, so that the upward movement of the lever, caused by the downward movement of the float in the tank, will raise the lever and by striking the arm or projection 16 will raise the vertical bar, and consequently lift the pawls out of engagement with the ratchet-wheel.

An inclined trigger-bar 19 is pivoted below the lever 17, and the vertical sliding bar 10 has a notch 20, which engages with the bar 19 and arrests its downward movement until the weight of the lever 17 comes upon it, as hereinafter described, and causes it to trip the trigger-bar and drop the vertical sliding bar and allow the pawls to drop into engagement with the ratchet.

The free or outer end of the lever 17 is connected with the float 20 in the tank 21 by a wire 18, which leads upward through a pulley 23 on the windmill-frame above and thence is carried over pulleys 24 along the upper end of poles 25 to the float in the tank, and a pea or weight 26 on its outer end serves to draw it downward and give it weight to operate the trigger-bar. The lower end of the trigger-bar is slightly bent or curved upward, as at $x$, so that as the lever 17 strikes this curve the trigger-bar is slightly rocked, so as to disengage it from the notch 20.

In operation the outer end of the lever 17 moves with the float in the tank, but in a reverse direction, so that when the tank is full and the float is at its highest position the lever 17 is lowered, so as to operate the trigger-bar and release the notch from the vertical sliding bar and allow that bar to drop and engage the pawls with the ratchet-teeth of the wheel 3. This causes the drum to wind up the chain or wire 12 and throw the wind-wheel out of action; but before this action is completed the knot or enlargement 14 arrives at the hole in the two-armed lever 13 and draws the arm of the lever downward. This causes its opposite arm to be elevated and draw upon the wire 15 and elevate the pawl-lever 7 and lift the pawls out of engagement with the ratchet-wheel, so as to stop the winding action of the windlass. This operation is repeated each time the tank is filled and the water and float are lowered, so that a uniform quantity of water is continually kept in the tank and overflow is prevented.

The mechanism is simple and easily kept in order, and it can be so applied that the tank can be stationed and kept full without manual attention at any distance from the windmill.

Having thus described my invention, what I claim, and desire to secure by Letters Patent, is—

1. In an automatic windmill-regulator, a tank; a float in the tank; a lever connected with and operated by said float so as to be moved in a direction the reverse of the float; a winding-shaft; a ratchet-wheel on the winding-shaft; pawls adapted to engage with the teeth on said ratchet-wheel; a vertically-sliding bar adapted to be raised and lowered by said lever, and flexible connections between said vertically-sliding bar and the pawls of the ratchet-wheel whereby the pawls are disengaged from the teeth of the ratchet-wheel and held in suspension when the vertically-sliding bar is elevated, substantially as described.

2. In a windmill-regulator, a winding-shaft; a ratchet-wheel on said winding-shaft; pawls adapted to engage with the teeth on said ratchet-wheel; a tank; a float in the tank; a vertically-sliding bar connected with the pawls by a flexible connection; a lever connected with and operated by the float in the tank; a notch in said vertically-sliding bar; a trigger bar or latch adapted to engage with said notch and hold the vertically-sliding bar in suspension, and a trip on said trigger bar or latch adapted to be operated by the descent of the lever so as to release the trigger from the notch, substantially as described.

3. In a windmill-regulator of the class described, a winding-shaft; a ratchet-wheel on said shaft; a lever fulcrumed on the winding-shaft and connected with pawls adapted to engage with the teeth on said ratchet-wheel; a two-armed lever located between the winding-shaft and windmill; a lifting wire, or cable connecting said pawls with the vanes of the wind-wheel and passing through one arm of said two-armed lever; an enlargement on said cable between the two-armed lever and windmill, and a wire connecting the opposite arm of said two-armed lever with the pawls of the ratchet-wheel, whereby the winding up of the cable on the winding-shaft causes the opposite arm of the lever to tilt and lift the pawls out of engagement with the teeth of the ratchet-wheel, substantially as described.

ANTONE P. HOESLY.

Witnesses:
L. SCHMIDT,
A. W. FROMENT.